(12) United States Patent
Marczi et al.

(10) Patent No.: US 9,561,865 B2
(45) Date of Patent: Feb. 7, 2017

(54) SYSTEMS AND METHODS FOR IMPROVING POSITIONAL AWARENESS WITHIN AN AIRPORT MOVING MAP

(71) Applicant: HONEYWELL INTERNATIONAL INC., Morristown, NJ (US)

(72) Inventors: Tomas Marczi, Beroun (CZ); Jan Flasar, Brno (CZ); Juliana Sevcikova, Brno (CZ); Christine Marie Haissig, Chanhassen, MN (US); Stephen Whitlow, St. Louis Park, MN (US); Kevin J Conner, Kent, WA (US); John Howard Glover, Seattle, WA (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 6 days.

(21) Appl. No.: 14/623,004

(22) Filed: Feb. 16, 2015

(65) Prior Publication Data

US 2016/0236795 A1  Aug. 18, 2016

(51) Int. Cl.
| | | |
|---|---|---|
| *B64D 45/00* | (2006.01) | |
| *G01S 7/22* | (2006.01) | |
| *G06F 3/14* | (2006.01) | |
| *G08G 5/00* | (2006.01) | |
| *G08G 5/04* | (2006.01) | |
| *G08G 5/06* | (2006.01) | |
| *G01S 13/93* | (2006.01) | |
| *G01S 13/91* | (2006.01) | |

(52) U.S. Cl.
CPC .............. *B64D 45/00* (2013.01); *G01S 7/22* (2013.01); *G06F 3/14* (2013.01); *G08G 5/0021* (2013.01); *G08G 5/045* (2013.01); *G08G 5/065* (2013.01); *G01S 13/931* (2013.01); *G01S 2013/916* (2013.01)

(58) Field of Classification Search
CPC .......... B64D 45/00; G01S 7/22; G01S 13/931; G06F 3/14; G08G 5/0021; G08G 5/045; G08G 5/065
See application file for complete search history.

(56) References Cited

U.S. PATENT DOCUMENTS

| | | |
|---|---|---|
| 7,868,785 B1 | 1/2011 | Wang |
| 8,335,642 B2 | 12/2012 | Wipplinger et al. |
| 8,736,633 B2 | 5/2014 | Gurusamy |
| 2013/0113819 A1* | 5/2013 | Gurusamy ............ G08G 5/065 345/592 |

OTHER PUBLICATIONS

Extended EP Search Report for Application No. 16154747.6-1811 dated Jul. 15, 2016.

* cited by examiner

*Primary Examiner* — Leon Flores
(74) *Attorney, Agent, or Firm* — Lorenz & Kopf, LLP

(57) ABSTRACT

Systems and methods for displaying a location reference indicator (LRI) associated with an ownship icon are provided. In various embodiments, an airport moving map (AMM) is displayed, and the ownship icon is displayed in the AMM, where the ownship icon represents the ownship. A degree of zoom of the AMM is determined. In response to a determination that the degree of zoom is not within a range of center referenced threshold values, a first LRI is displayed that indicates that the icon representing the ownship is not to scale with other objects displayed in the AMM. In response to a determination that the degree of zoom is within the range of center referenced threshold values, a second LRI is displayed.

11 Claims, 5 Drawing Sheets

SYSTEMS AND METHODS FOR IMPROVING POSITIONAL AWARENESS WITHIN AN AIRPORT MOVING MAP

TECHNICAL FIELD

The present invention generally relates to systems and methods for improving positional awareness within an airport moving map, and more particularly to the display of a location reference indicator (LRI) in association with an ownship icon to improve positional awareness of an ownship on the airport moving map.

BACKGROUND

An airport moving map (AMM) is a map of an airport that can be displayed for a pilot of an ownship (or simply, a "pilot"), An AMM may include a variety of objects, such as obstacles, taxiways, hold bars, and the like. In addition, an AMM may include (i.e., overlay the AMM with) an ownship icon that represents the ownship on the AMM.

Conventional AMMs may include a "zoom in" or "range in" and a "zoom out" or "range out" function. This function may permit a pilot of the ownship to zoom in or zoom out on the AMM as desired. In other words, a zoom in/zoom out function permits a pilot to adjust a scale factor, or range, displayed by the AMM. Thus, a pilot may select, for example, a range in terms of nautical miles. The ownship icon may or may not scale with the AMM.

Accordingly, in many instances, although the pilot may adjust the degree of zoom or range displayed by the AMM, the dimensions of the ownship icon on the AMM may remain constant. In other words, the dimensions of the ownship icon may not change as the range changes. Thus, as a pilot zooms in or out within the AMM, the pilot may not be able to accurately determine where the aircraft is actually located. For instance, as the pilot zooms out on the AMM, the ownship icon may enlarge correspondingly so that the pilot does not lose track of the icon. As the icon enlarges, however, it can become increasingly difficult to determine where precisely the ownship is located on the AMM, since the icon is not to scale with objects, such as runways, on the AMM. Hence, to avoid pilot confusion based upon the degree of zoom within the AMM, there is a need for systems and methods that improve pilot positional (and therefore situational) awareness within an AMM as well as within an actual airport.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method for displaying a location reference indicator (LRI) associated with an ownship icon includes displaying an airport moving map (AMM), and displaying the ownship icon in the AMM, where the ownship icon represents the ownship A degree of zoom of the AMM is determined. In response to a determination that the degree of zoom is not within a range of center referenced threshold values, a first LRI is displayed that indicates that the icon representing the ownship is not to scale with other objects displayed in the AMM. In response to a determination that the degree of zoom is within the range of center referenced threshold values, a second LRI is displayed.

In another embodiment, a system for displaying a location reference indicator (LRI) associated with an ownship icon includes a display, an airport moving map (AMM) that includes a map of an airport database, and an airport moving map generating system (AGS). The AGS is communicatively coupled to the display and the AMM database. The AGS is configured to: receive the map of the airport and an ownship position and command the display to render an AMM that includes the ownship icon representing the ownship position on the map of the airport, determine a degree of zoom of the AMM, generate, in response to a determination that the degree of zoom is not within a range of threshold values, a first LRI that indicates that the ownship icon is not to scale with other objects displayed in the AMM, and generate, in response to a determination that the degree of zoom is within the range of threshold values, a second LRI.

In yet another embodiment, a system for displaying a location reference indicator (LRI) associated with an ownship icon includes a display, an airport moving map (AMM) database that includes a map of an airport, and an AMM generating system (AGS). The AGS is communicatively coupled to the display and the AMM database and is configured to (i) receive the map of the airport and an ownship position and (ii) generate an AMM that includes an ownship icon and a LRI. The LRI alerts a pilot of the ownship to a difference in relative scale between the ownship icon and other objects depicted within the AMM.

Furthermore, other desirable features and characteristics of the systems and methods described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As used herein, the term "ownship" may refer to any vehicle or platform displayed in association with an icon (or "ownship icon") in conjunction with an AMM. Thus, in various embodiments, an ownship may comprise an aircraft, while an ownship icon may comprise an icon representing the aircraft displayed in conjunction with an AMM.

As used herein, the term "forward" may refer to the direction of travel of the ownship and/or any point located proximate the nose, cockpit, or pilot seat of the ownship.

As described above, many conventional AMMs comprise an airport map. An icon that represents an ownship (e.g., a location or position of the ownship, dimensions of the ownship, and the like) may be overlaid on or displayed in conjunction with the AMM. In addition, many conventional AMMs include a zoom or range selection feature, such as "zoom in" and "zoom out" This feature may permit a pilot of the ownship to zoom in or zoom out on the AMM as desired. In other words, many AMMs permit a pilot to change the scale of the objects displayed on the AMM (e.g., runways, taxiways).

However, in many instances, although the pilot may adjust the degree of zoom of the AMM, the dimensions of the ownship icon may remain constant for become of greater or lesser scale relative to other objects) displayed on the AMM. In other words, the dimensions of the ownship icon may not change (or change such that a pilot becomes confused as to its size and position relative to other objects) with the degree of zoom. Thus, as a pilot of the ownship zooms in and out within the AMM, the pilot of the ownship may mistakenly believe that the ownship icon is true to scale (where the ownship icon may in fact be smaller or larger relative to other objects displayed in the AMM, depending, for example, upon the degree of zoom). In addition, the pilot may be confused as to where the range is adjusted, as to where within the ownship icon the real-world ownship is actually located.

Figure 1:
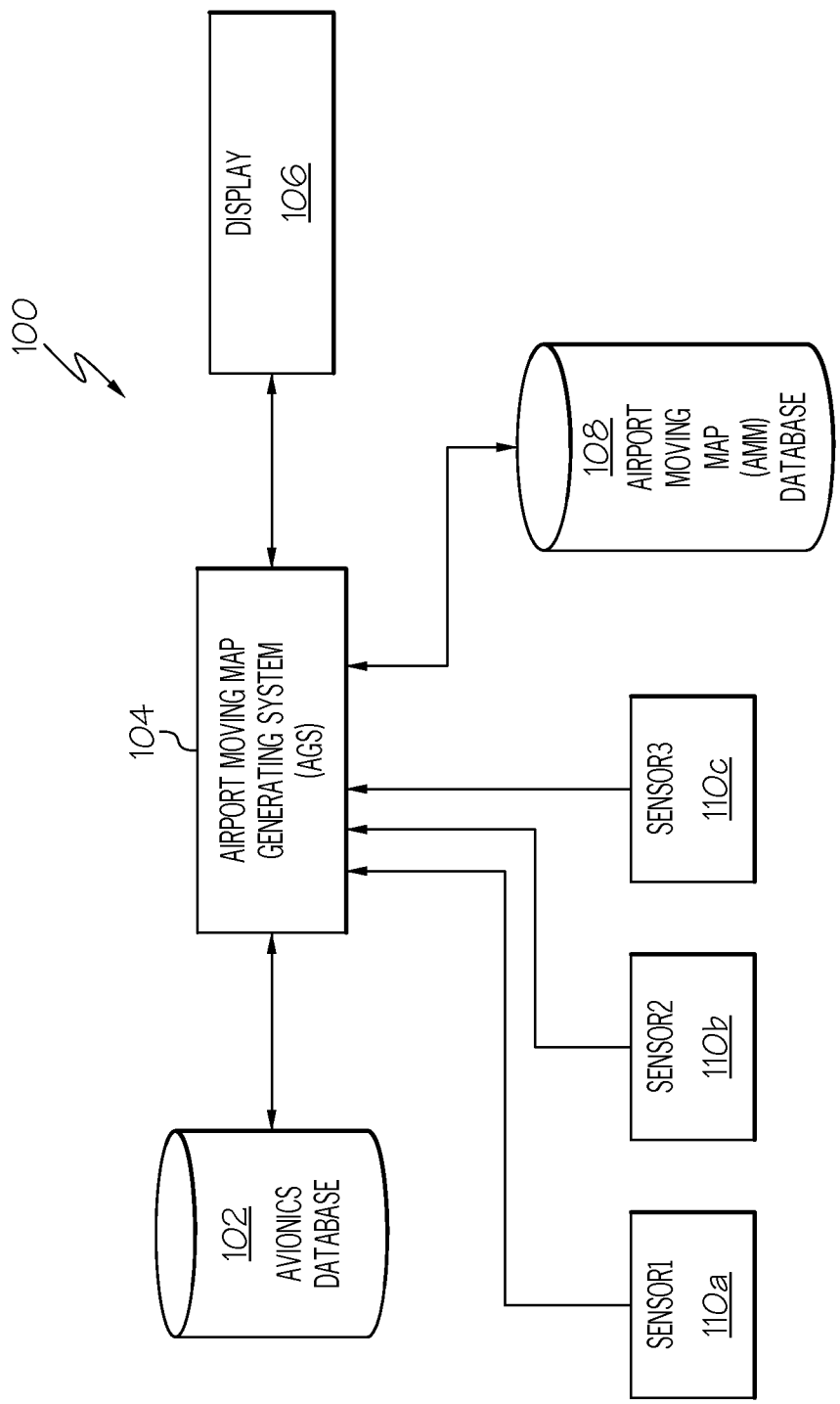
FIG. 1 illustrates, in accordance with various embodiments, a system for improving pilot positional awareness within an AMM.

Accordingly, with reference to FIG. 1, a system 100 for improving pilot positional awareness within an AMM is shown. The system can comprise an avionics database 102, an AMM generating system ("AGS") 104, a display 106, an AMM database 108, and/or one or more sensors, e.g., 110a, 110b, 110c.

The avionics database 102 can comprise any tangible, non-transitory, memory or computer-readable medium configured to store avionics data, such as dimensions of an ownship, a type associated with the ownship, and a location of one or more global positioning (GPS) antennas Moreover, in various embodiments, a position or location of an ownship may be sensed in real time by one or more sensors 110a-c (described below), one or more precision navigation systems (e.g., GPS), or the like. The position of the ownship can be transmitted by the sensors 110a-c to the AGS 104.

The AGS 104 can comprise, in various embodiments, any computer-based system, computer processor, and the like that is configured to receive airport map data from the AMM database 108 and avionics data from the avionics database 102 and sensor data from the one or more sensors 110a-c, and generate, based upon these data, an AMM that includes an ownship icon and location reference indicator (LRI), as described herein. Thus, the AGS 104 can be communicatively coupled to the avionics database 102, the AMM database 108 and the one or more sensors 110a-c.

The display 106 can comprise any display configured to display an AMM and an ownship icon and an ownship LRI. For example, in various embodiments, the display 106 can comprise a computer monitor, a cathode ray tube, an LED display, a plasma display, an LCD display, an OLED display, or any other suitable display. The display can be communicatively coupled to the AGS 104 and can display AMM and other received data.

The AMM database 108 can comprise any tangible, non-transitory computer-readable medium or memory that stores or is configured to store one or more airport moving maps or airport moving map data. The AMM database can include, in various embodiments, any of a variety of airport data, such as, for example, runway data, taxiway data, building or other object data, and runway or taxiway marking data. The AMM database can be communicatively coupled, as described herein, to the AGS 104.

The sensors 110a, 110b, and 110c can, in various embodiments, collect or receive data about an ownship. For example, the sensors 110a-c can collect ownship position data, ownship speed, and ownship heading data. The sensors 110a-c can be communicatively coupled to the AGS 104 and can transmit the data they collect to the AGS 104 for generation by the AGS 104 of the ownship icon and LRI and/or the underlying AMM.

Figure 2:
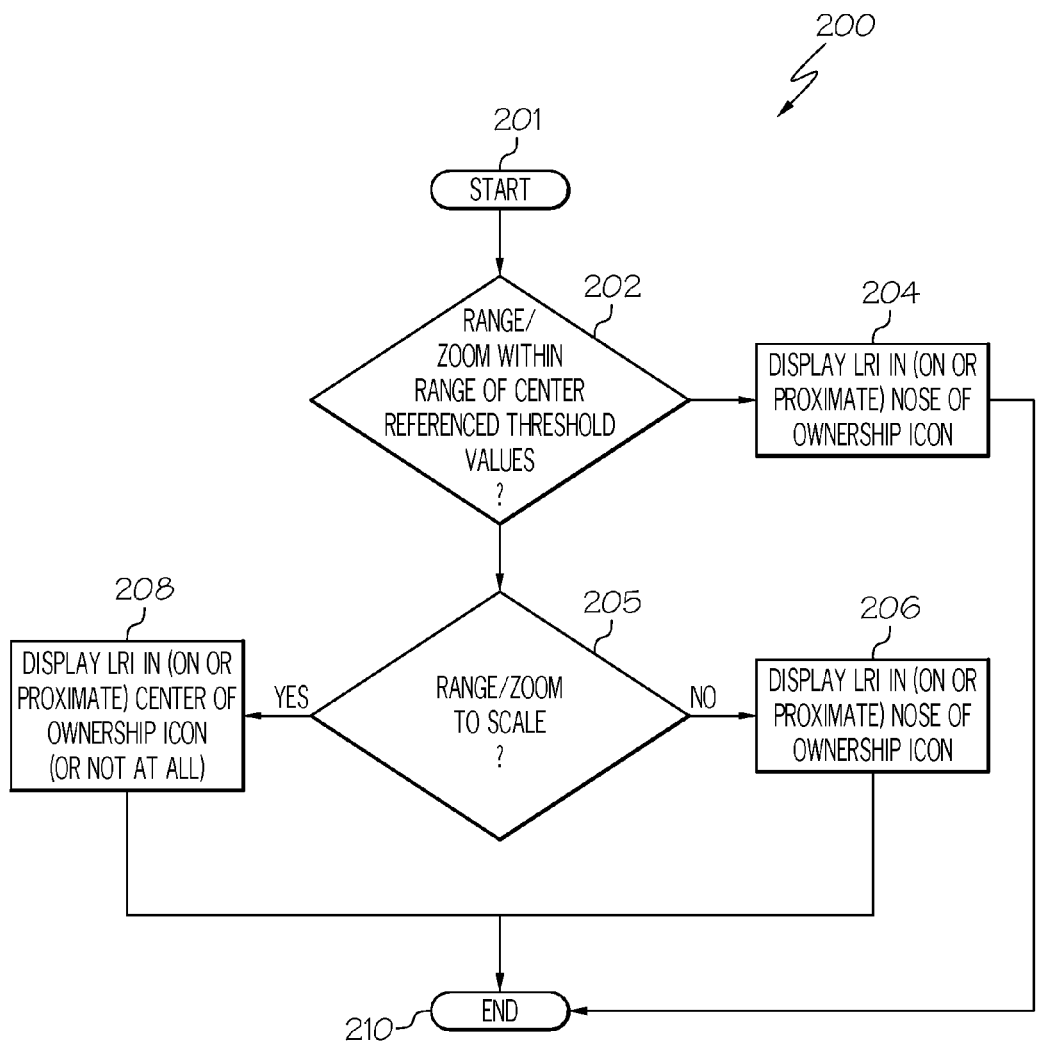
FIG. 2 illustrates, in accordance with various embodiments, a method (depicted as a flowchart) for improving pilot positional awareness within an AMM.
Figure 3A:
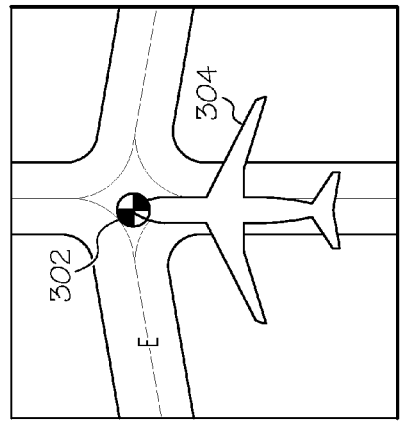
FIGS. 3A-3D each illustrate, in accordance with various embodiments, an AMM that includes an ownship icon and various styles of LRIs displayed substantially in or over the nose of the ownship icon.
Figure 3B:
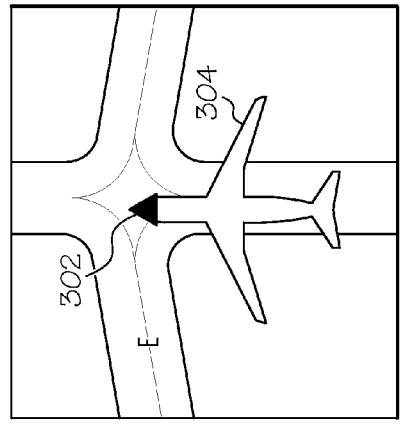
Figure 3C:
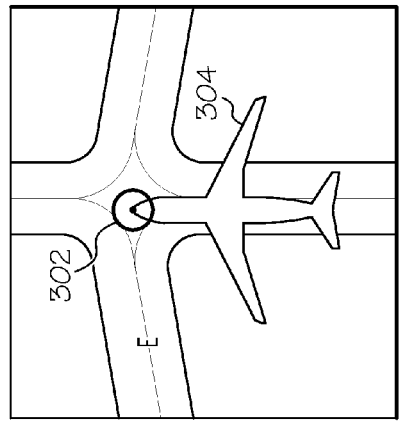
Figure 3D:
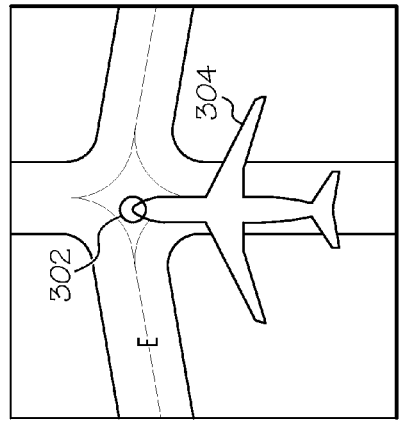
Figure 4A:
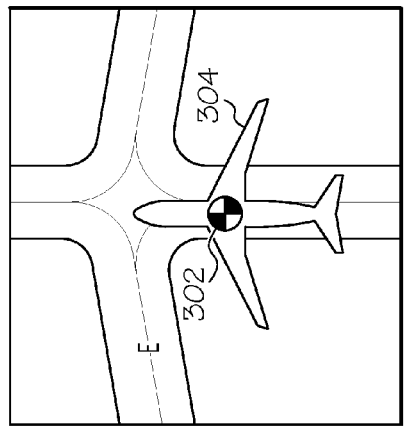
FIGS. 4A-4E each illustrate, in accordance with various embodiments, an AMM that includes an ownship icon various styles of LRIs displayed substantially centrally in or over the ownship icon.
Figure 4B:
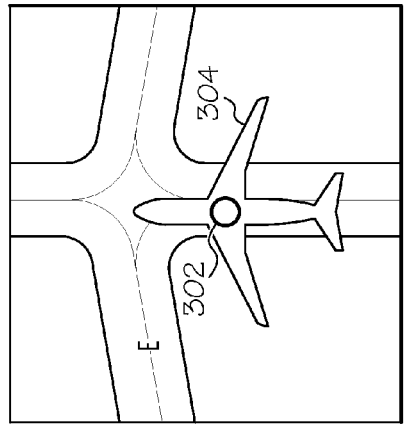
Figure 4C:
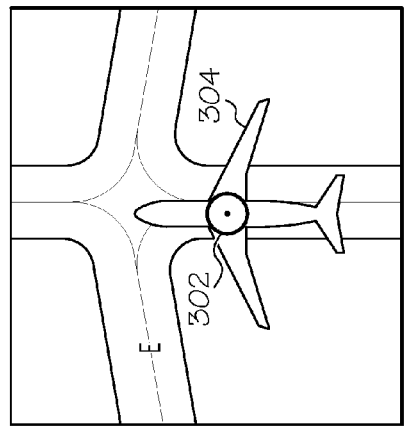
Figure 4D:
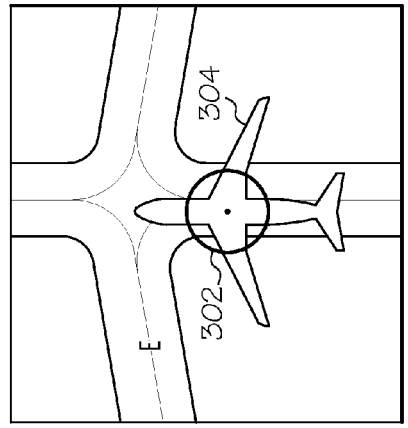
Figure 4E:
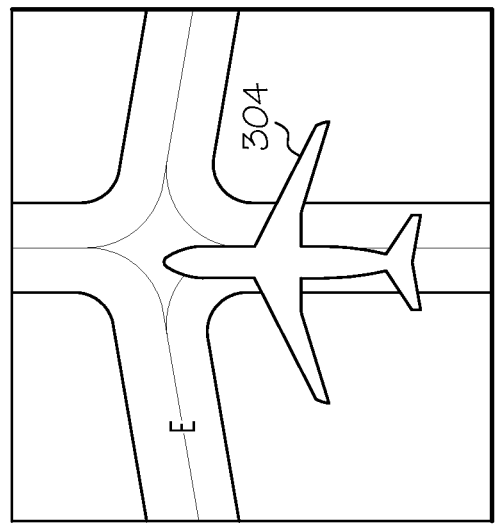

With reference now to FIG. 2, a method 200 (depicted as a flowchart) for improving pilot positional awareness within an AMM is shown. As described above, because the dimensions of an ownship icon displayed within may conventional AMMs may not be adjusted (or adjusted relative to the scale of other objects displayed in the AMM) by the AGS 104 as the pilot adjusts the degree of zoom of the AMM, the pilot may become confused as to the scale and position of the ownship, as represented by the ownship icon, relative to other objects represented within the AMM (e.g., buildings, taxiways, and hold bars).

Therefore, beginning at step 201, the AGS 104 can determine a degree of zoom or range value of an AMM (i.e., whether, in general, the AMM is zoomed in or zoomed out and by how much or to what range value, such as, to 1.0 nautical mile). The AGS 104 can compare the degree of zoom or range value to a threshold zoom or range value and, based upon this comparison, determine whether the degree of zoom or range value is within a range of designated "center referenced" threshold values (step 202). A range of center referenced threshold values comprises, in various embodiments, a range, such as, for example, 0.05 nautical miles to 1.0 nautical miles, within which, the AGS 104 is configured to generate, as described herein, a LRI substantially centrally within the ownship icon. Outside of the range, the AGS 104 is configured to generate the LRI over the nose of the ownship icon.

Accordingly, the AGS 104 can determine, based on the degree of zoom/range value, whether to display a LRI, and, if displayed where on the AMM to place the LRI. For example, the AGS 104 can generate for display a LRI in, over, or proximate the nose of the ownship icon, to indicate that the ownship icon is not substantially to scale with other objects displayed within the AMM in response to a determination by the AGS 104 that the degree of zoom/range value is not within the range of designated center referenced threshold values (step 204). It will be appreciated that the LRI may be displayed using various types of graphic symbols and in various colors. Some non-limiting examples of LRIs 302 that may be displayed in, over, or proximate the nose of the ownship icon 304 are depicted in FIGS. 3A-3D.

Thus, a pilot can view the LRI 302 to quickly understand that the dimensions of the ownship icon 304 displayed within the AMM are not substantially to scale with other objects displayed within the AMM, and that the ownship icon 302 does not accurately represent the actual position of the entire ownship within the airport. Specifically, the pilot can view the LRI 302 in, over, or proximate to the nose of the ownship icon 304 to understand that the selected range is large (i.e., outside the range of center referenced values), that the ownship nose is substantially at the LRI depicted location, and that the ownship icon 304 is correspondingly oversized. The LRI 302 further serves to indicate to the pilot where, precisely, within the AMM, the real-world ownship is located.

Now, when the AGS 104 determines that the degree of zoom/range value is within the range of center referenced threshold values, the AGS 104 further determines whether the degree of zoom/range value is to scale with the scale of the displayed ownship icon (step 205).

If the degree of zoom/range value is not to scale with the scale of the displayed ownship icon, the AGS 104 displays the LRI 302 in, over, or proximate the center of the ownship icon 304. Moreover, the ownship icon 304 is displayed such that it is not to scale with other objects on the AMM (step 206). Some non-limiting examples of LRIs 302 that may be displayed in, over, or proximate the center of the ownship icon 304 are depicted in FIGS. 4A-4E.

Figure 5:
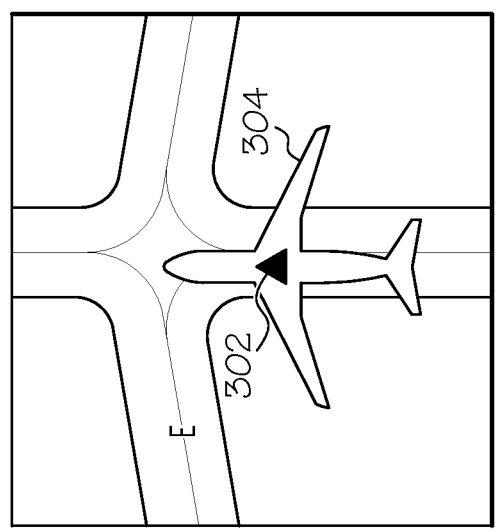
FIG. 5 illustrates, in accordance with various embodiments, an AMM that includes an ownship icon absent a LRI in response to a determination that the ownship icon is substantially to scale with other objects displayed within the AMM.

If the degree of zoom/range value is to scale, the AGS 104 can display the LRI 302 in, over, or proximate the center of the ownship icon 304, and the ownship icon 304 can be displayed such that it is substantially to scale with other objects on the AMM (step 208). It will be appreciated, however, that when the degree of zoom/range value is to scale with the scale of the displayed ownship icon, a pilot may rely less upon the LRI 302, since the ownship icon 304 is represented substantially to scale with other objects in the AMM. As such, and as depicted in FIG. 5 (and step 208), in some embodiments, when the degree of zoom/range value is to scale with the scale of the displayed ownship icon, the AGS 104 may be configured to omit the LRI, and display the ownship icon 304 to scale with other objects on the AMM.

The process 200 can, in various embodiments, terminate hereafter (step 210) or loop back to the starting point (step 201) as a repetitive procedure.

Therefore, the systems and methods described herein can permit a pilot to quickly assess a scale of an object displayed in an AMM relative to an ownship icon displayed in the AMM and, in turn, to avoid the confusion that can accompany variations in the degree of zoom or range value in an AMM. A LRI can, as described herein, therefore quickly alert a pilot to a difference in relative scale between an ownship icon and other objects displayed within an AMM as well as to the true position of the ownship.

Persons of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. This functionality may be implemented as hardware or software depending upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method for displaying a location reference indicator (LRI) associated with an ownship icon, the method comprising:
    displaying an airport moving map (AMM);
    displaying the ownship icon in the AMM, the ownship icon representing an ownship;
    determining a degree of zoom of the AMM;
    displaying, in response to a determination that the degree of zoom is not within a range of center referenced threshold values, a first LRI that indicates that the icon representing the ownship is not to scale with other objects displayed in the AMM; and
    displaying, in response to a determination that the degree of zoom is within the range of center referenced threshold values, a second LRI,
    wherein:
        the first LRI is displayed substantially non-centrally within the ownship icon, and
        the second LRI is displayed substantially centrally within the ownship icon.

2. The method of claim 1, wherein the first LRI is displayed substantially forward within the ownship icon.

3. The method of claim 1, wherein the first LRI is displayed over the nose of the ownship icon.

4. The method of claim 1, wherein only one of the first LRI or second LRI is displayed.

5. The method of claim 1, wherein the second LRI is not displayed.

6. A system for displaying a location reference indicator (LRI) associated with an ownship icon, the system comprising:
    a display;
    an airport moving map (AMM) database that includes a map of an airport; and
    an airport moving map generating system (AGS) communicatively coupled to the display and the AMM database, the AGS configured to:
        receive the map of the airport and an ownship position and command the display to render an AMM that includes the ownship icon representing the ownship position on the map of the airport,
        determine a degree of zoom of the AMM,
        generate, in response to a determination that the degree of zoom is not within a range of threshold values, a first LRI that indicates that the ownship icon is not to scale with other objects displayed in the AMM, and
        generate, in response to a determination that the degree of zoom is within the range of threshold values, a second LRI, wherein:
            the first LRI is displayed substantially non-centrally within the ownship icon, and
            the second LRI is displayed substantially centrally within the ownship icon.

7. The system of claim 6, wherein the AGS commands the display to render the AMM such that the first LRI is displayed substantially forward within the ownship icon.

8. The system of claim 6, wherein the AGS commands the display to render the AMM such that the first LRI is displayed within a nose of the ownship icon.

9. The system of claim 6, wherein the AGS commands the display to render the AMM such that only one of the first LRI or second LRI is displayed.

10. The system of claim 6, wherein the AGS commands the display to render the AMM such that the first LRI is not displayed.

11. The system of claim 6, wherein the AGS commands the display to render the ownship icon such that the dimensions of the ownship icon are constant.

* * * * *